(12) United States Patent
Stegenga

(10) Patent No.: US 7,228,712 B1
(45) Date of Patent: Jun. 12, 2007

(54) SYNTHETIC ICE AND ASSOCIATED METHODS

(76) Inventor: Jack B. Stegenga, 2896 Bowers Harbor Rd., Traverse City, MI (US) 49686

( * ) Notice: Subject to any disclaimer, the term of this patent is extended or adjusted under 35 U.S.C. 154(b) by 248 days.

(21) Appl. No.: 11/087,415

(22) Filed: Mar. 24, 2005

(51) Int. Cl.
F25D 3/08 (2006.01)

(52) U.S. Cl. .................. 62/530; 62/371; 62/457.2

(58) Field of Classification Search ............ 62/371, 62/457.1, 457.2, 457.4, 530
See application file for complete search history.

(56) References Cited

U.S. PATENT DOCUMENTS

| | | | |
|---|---|---|---|
| 4,404,820 A | | 9/1983 | Romaine |
| 4,908,248 A | * | 3/1990 | Nakashima et al. ....... 428/35.5 |
| 5,135,787 A | * | 8/1992 | Bair ...................... 428/36.1 |
| 5,150,707 A | | 9/1992 | Anderson |
| 5,391,198 A | * | 2/1995 | Cheney et al. ............. 607/114 |
| 5,582,028 A | | 12/1996 | Rilling et al. |
| 5,697,961 A | | 12/1997 | Kiamil |
| 5,843,145 A | | 12/1998 | Brink |
| 5,935,666 A | * | 8/1999 | Corbic Bellinger et al. ..... 428/35.4 |
| 6,170,268 B1 | * | 1/2001 | Elfert et al. .................... 62/63 |
| 6,189,330 B1 | * | 2/2001 | Retallick et al. .............. 62/371 |
| 6,610,084 B1 | | 8/2003 | Torres |

* cited by examiner

Primary Examiner—Melvin Jones

(57) ABSTRACT

An article includes a flexible bag that has a cavity therein. A predetermined quantity of ice pellets are deposited within a cavity of the bag and a predetermined quantity of polymer pellets are deposited within the cavity of the bag and mixed with the ice pellets such that a homogenous mixture of the ice pellets and the polymer pellets is formed within the cavity. Such polymer pellets and ice pellets have coextensive shapes. The polymer pellets further have liquid-absorbing characteristics such that melted ice is advantageously absorbed and retained by the polymer pellets during extended periods of time, thereby conveniently eliminating the need to drain the bag. The polymer pellets have vapor-releasing characteristics such that thermo-energy is released from the melted ice as a vapor rather than as a liquid to thereby advantageously prevent a surrounding area from becoming water damaged.

13 Claims, 4 Drawing Sheets

SYNTHETIC ICE AND ASSOCIATED METHODS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to synthetic ice and, more particularly, to synthetic ice and associated methods for absorbing melted ice and the like.

2. Prior Art

The use of coolers for beverages and foodstuff is well known in the prior art. In order to keep the items contained in the cooler at the appropriate temperature it has become common practice to place a quantity of ice within the cooler. The insulating properties of the cooler cause the ice to cool down the interior, which in turn retards the melting of the ice, thus allowing the cooler to stay cold for longer periods of time.

Unfortunately, it is inevitable that the ice will melt as heat transfer causes the ice to go through a phase change from a solid ice state to a liquid water state. The liquid water state is undesirable since it may cause certain foods to become soggy as they absorb water. Furthermore, since the water's temperature is lower than that of the ice, the foodstuff and beverages are no longer kept sufficiently cool. One attempt to prevent melting ice from causing items stored in a cooler to become soggy involves the use of cold packs.

Such cold packs are usually rectangular shaped containers, of a rigid plastic construction that contain water therein. These cold packs are placed in a freezer to freeze the water within the cold pack and then placed in the cooler to act as a block of ice, with the advantage that when the water melts the water does not come in contact with the items stored in the cooler. Cold packs do have their disadvantages though. The ice held therein still melts, thus diminishing the cooling capabilities of the cold pack. Another problem inherent to cold packs is the rigid design thereof. Such a design does not allow the pack to come in close contact with the entire surface of the foodstuff, as ice would, and thus, cools certain surfaces of the food more so than others. A third problem is the fact that conventional cold packs are not adjustable in size, thus limiting their use to coolers of a certain size and shape.

Accordingly, a need remains for synthetic ice and associated methods in order to overcome the above-noted shortcomings. The present invention satisfies such a need by providing a synthetic ice and associated method that is easy and convenient to use, portable, provides space savings, and is adjustable in nature. Such synthetic ice keeps food and beverages cold for extended periods of time and ensures that the items remain at temperatures fit for consumption. The synthetic ice also helps to prevent foods from spoiling which not only prevents waste, but also reduces the risks of people experiencing food-borne illnesses, thereby enhancing safety. Such synthetic ice and associated method further allows an individual to adjust the cold pack to various sizes for different applications. The flexible design of the pack also allows same to be wrapped around food items to provide more effective cooling thereof.

BRIEF SUMMARY OF THE INVENTION

In view of the foregoing background, it is therefore an object of the present invention to provide synthetic ice and associated methods thereof. These and other objects, features, and advantages of the invention are provided by a thermo-insulating article for absorbing melted ice and the like.

The article includes a flexible bag that has a cavity therein. A predetermined quantity of ice pellets are deposited within a cavity of the bag. In a preferred embodiment, the bag preferably includes a water-impermeable outer surface for effectively maintaining the ice pellets and the polymer pellets confined within the cavity.

In an alternate embodiment, the bag may include a water-permeable outer surface for allowing surrounding fluids to penetrate the bag and advantageously become absorbed by the polymer pellets.

In yet another embodiment, the bag preferably includes a plurality of monolithically formed walls. One of the walls defines a substantially planar bottom surface and the other walls extend upwardly therefrom, engaging a cooler's sidewalls so that the bag effectively becomes nested within a cavity of the cooler and confronts an entire interior surface thereof.

A predetermined quantity of polymer pellets are deposited within the cavity of the bag and mixed with the ice pellets such that a homogenous mixture of the ice pellets and the polymer pellets are formed within the cavity. Such polymer pellets and ice pellets have coextensive shapes.

The polymer pellets have liquid-absorbing characteristics such that melted ice is advantageously absorbed and retained by the polymer pellets during extended periods of time, thereby conveniently eliminating the need to drain the bag. The polymer pellets have vapor-releasing characteristics such that thermo-energy is released from the melted ice as a vapor rather than as a liquid to thereby advantageously prevent a surrounding area from becoming water damaged.

A method for containing melted ice within a confined area includes the steps of depositing a predetermined quantity of ice pellets and polymer pellets within the cavity of the bag and mixing with the ice pellets such that a homogenous mixture of the ice pellets and the polymer pellets are formed within the cavity.

An alternate method may further include the step of attaching a pair of elongated and rectilinear support beams to a ground surface wherein the support beams vertically extend upwardly therefrom. The bag is medially intercalated between the support beams and maintained at a static position adjacent to an exterior body of water.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 2:
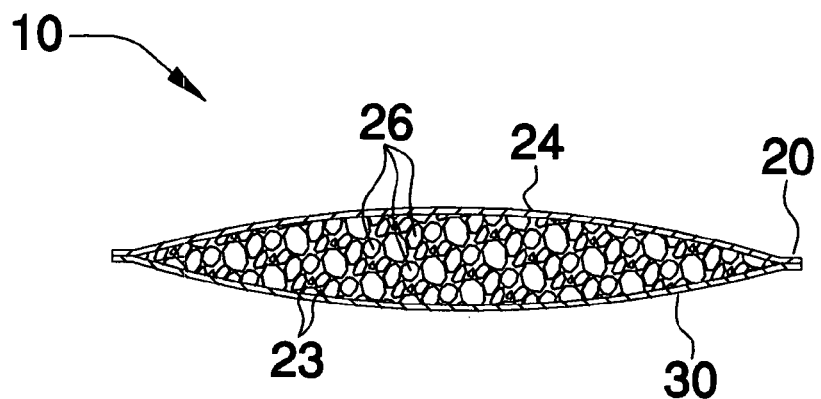
FIG. 2 is a cross-sectional view of the of the bag shown in FIG. 1, showing the mixture of ice pellets and polymer pellets contained therein, taken along line 2—2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The article of this invention is referred to generally in FIGS. 1–6 by the reference numeral 10 and is intended to provide synthetic ice and associated methods. It should be understood that the article 10 may be used to provide cooling and absorbing features in many different types of applications and should not be limited in use to only cooling foodstuff in a cooler.

Figure 1:
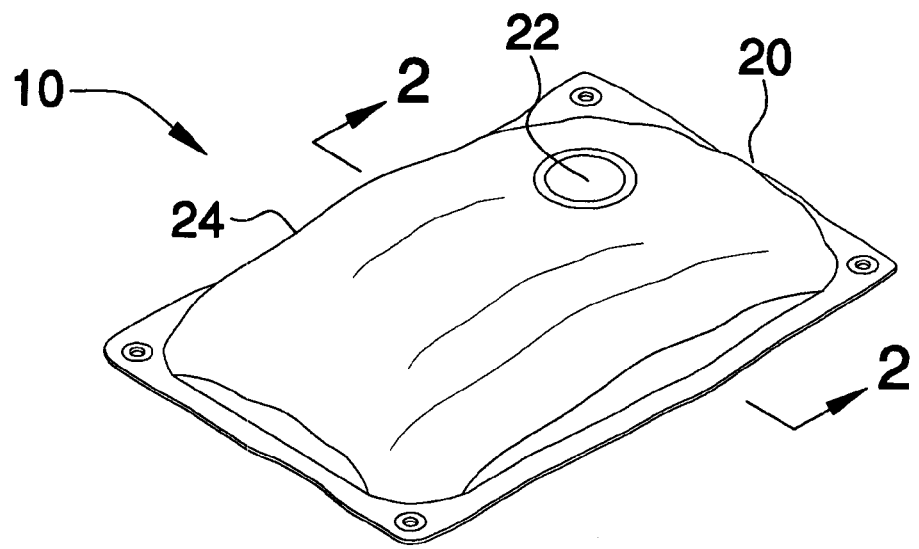
FIG. 1 is a perspective view showing a flexible bag, in accordance with the present invention.

Referring initially to FIG. 1, the article 10 includes a flexible bag 20 that has a cavity 21 therein. The bag 20 may further include a cap 22 for advantageously allowing a user to add or remove a quantity of ice pellets 23 (described herein below) and polymer pellets 26 (described herein below) as need requires. A predetermined quantity of ice pellets 23 are deposited within a cavity 21 of the bag 20. In a preferred embodiment, the bag 20 includes a water-impermeable outer surface 24 for effectively maintaining the ice pellets 23 and the polymer pellets 26 confined within the cavity 21.

Figure 5:
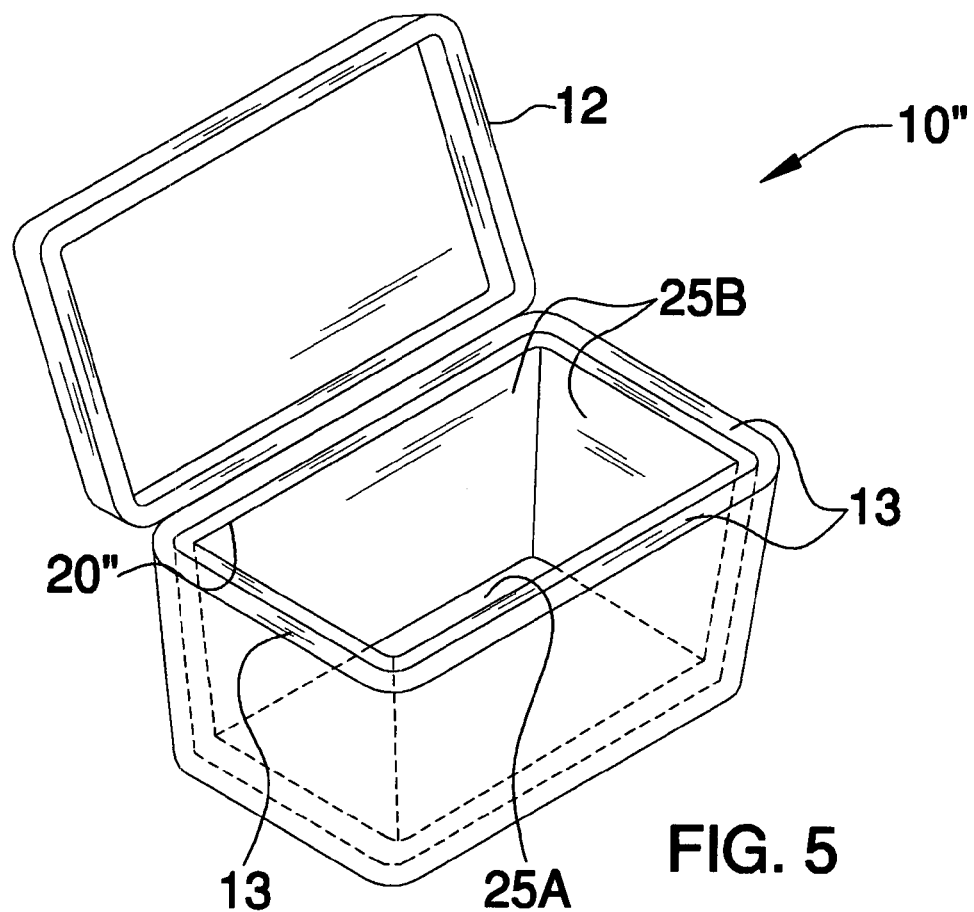
FIG. 5 is a perspective view showing an alternate embodiment of the present invention, wherein a cooler cavity is lined with the water-permeable bag.
Figure 6:
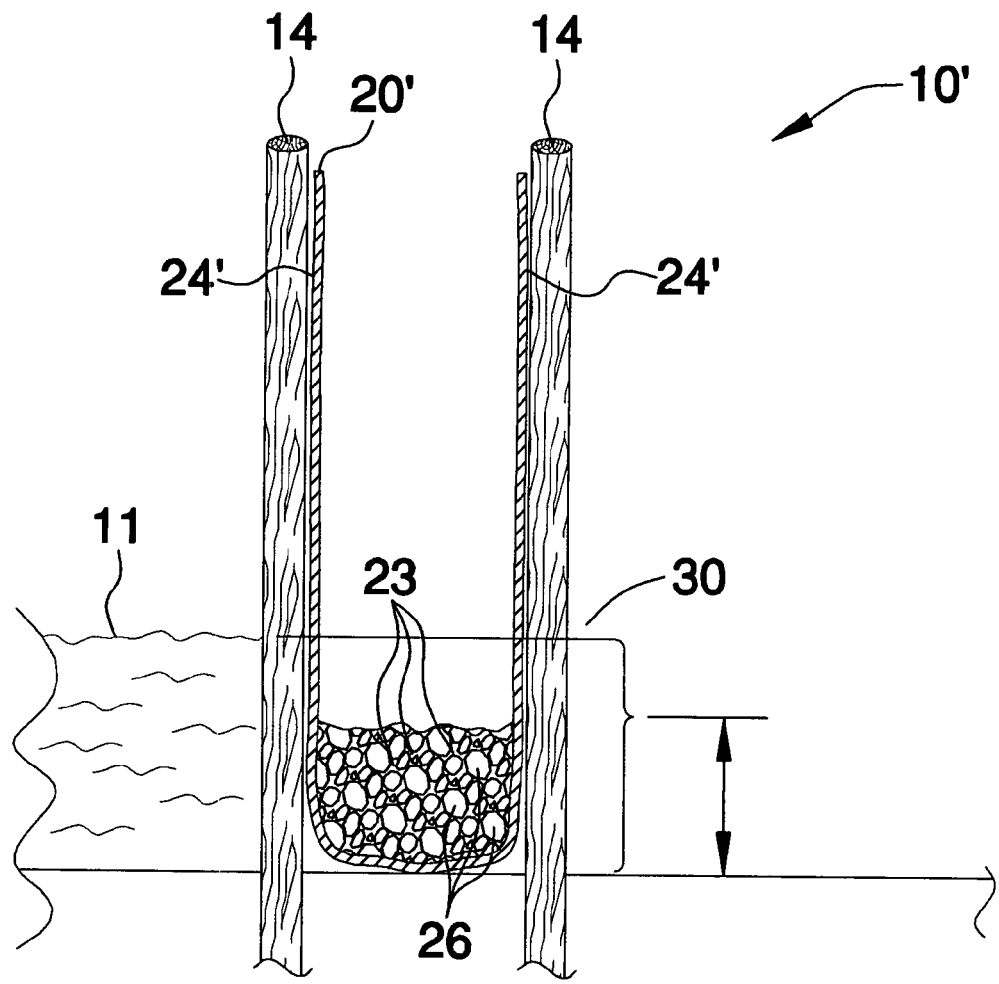
FIG. 6 is a side-elevational view showing an alternate method of using the polymer pellets for creating a water absorbent barrier.

Referring to FIG. 5, in an alternate embodiment 10', the bag 20' includes a water-permeable outer surface 24' for allowing surrounding fluids 11 to penetrate the bag 20' and advantageously become absorbed by the polymer pellets 26. Such an embodiment 10' can also be adapted so the bag only contains polymer pellets 26. The bag 20' can then be placed in the bottom of a cooler 12 with loose ice on top and as the ice melts, the water is absorbed by the polymer pellets 26.

Figure 4:
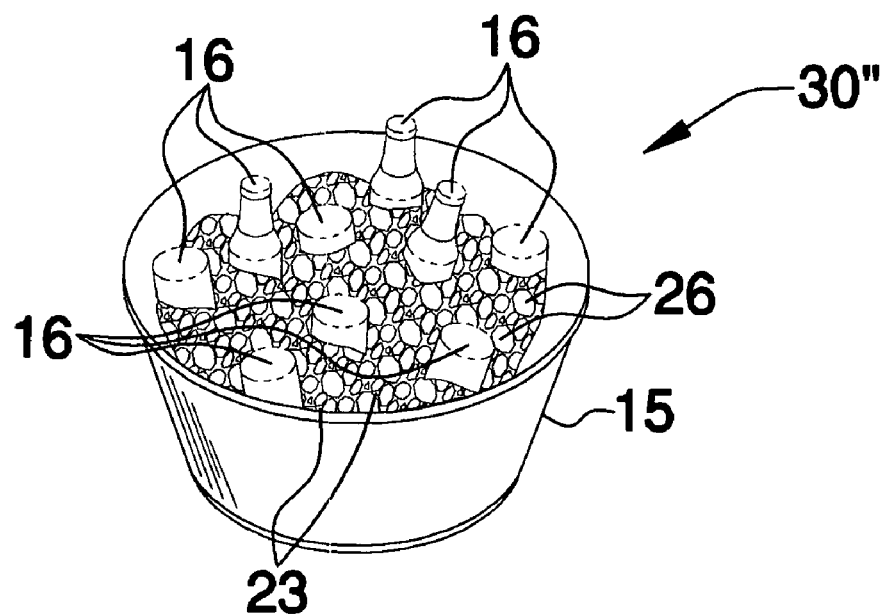
FIG. 4 is a perspective view showing the mixture of ice pellets and polymer pellets loosely placed within a container to simulate loose ice for keeping beverages cool.

Referring to FIG. 4, in yet another embodiment 10", the bag 20" includes a plurality of monolithically formed walls 25. One of the walls 25A defines a substantially planar bottom surface and the other walls 25B extend upwardly therefrom engaging a cooler's 12 sidewalls 13 so that the bag 20" effectively becomes nested within a cavity of the cooler 12 and confronts an entire interior surface thereof.

Referring to FIGS. 2, 3, 4 and 6, a predetermined quantity of polymer pellets 26 are deposited within the cavity 21 of the bag 20 and mixed with the ice pellets 23 such that a homogenous mixture of the ice pellets 23 and the polymer pellets 26 are formed within the cavity 21. Such polymer pellets 26 and ice pellets 23 have coextensive shapes. The polymer pellets 26 are vital to the proper functioning of the article 10 due to their water absorbing and vapor-releasing characteristics described below. The vapor-releasing characteristic is further advantageous for allowing the bag 20 to be dried out and re-used multiple times, while not losing its effectiveness. Such polymer pellets 26 may, of course, be washed and sterilized to ensure user safety during re-use thereof and may also be provided in a variety of different colors, as is obvious to persons of ordinary skill in the art.

Still referring to FIGS. 2, 3, 4 and 6, the polymer pellets 26 have liquid-absorbing characteristics such that melted ice is advantageously absorbed and retained by the polymer pellets 26 during extended periods of time, thereby conveniently eliminating the need to drain the bag 20. The polymer pellets 26 have vapor-releasing characteristics such that thermo-energy is released from the melted ice as a vapor rather than as a liquid to thereby advantageously prevent a surrounding area from becoming water damaged.

Referring to FIGS. 1 and 2, a method 30 for containing melted ice within a confined area includes the steps of depositing a predetermined quantity of ice pellets 23 and polymer pellets 26 within the cavity 21 of the bag 20 and mixing with the ice pellets 23 such that a homogenous mixture of the ice pellets 23 and the polymer pellets 26 is formed within the cavity 21.

Referring to FIG. 5, an alternate method 30' further includes the step of attaching a pair of elongated and rectilinear support beams 14 to a ground surface wherein the support beams 14 vertically extend upwardly therefrom. The bag 20' is medially intercalated between the support beams 14 and maintained at a static position adjacent to an exterior body of water 11. This method can be applied to advantageously prevent flooding in certain areas.

Figure 3:
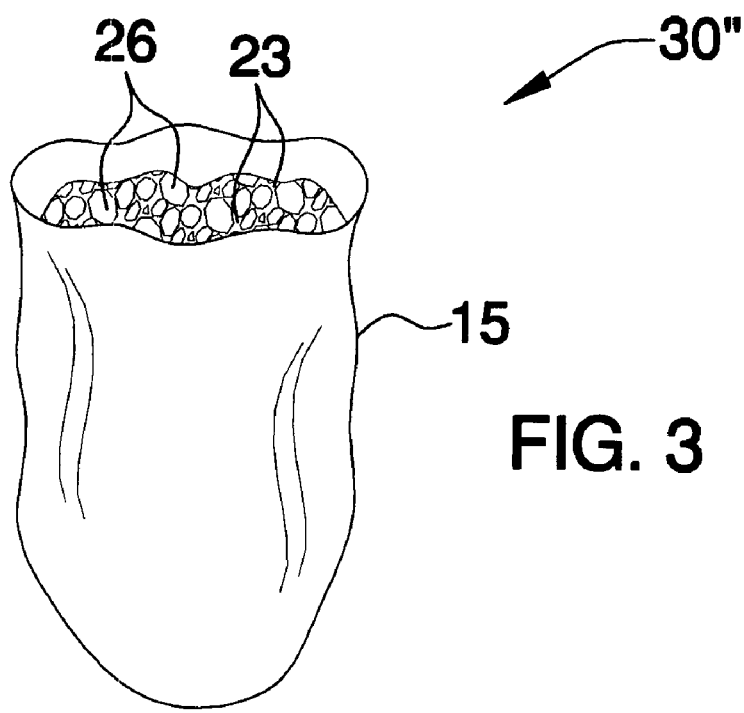
FIG. 3 is a perspective view showing a mixture of ice pellets and polymer pellets contained within a conventional plastic grocery bag.

Referring to FIGS. 3 and 4, in yet another method 30", the ice pellets 23 and the polymer pellets 26, are placed loosely in any suitable container 15 in the place of conventional ice in order to provide a more suitable way of cooling the beverages 16. This advantageously eliminates the need to drain off water as the ice melts, while maintaining the cooling capabilities of the melted ice through the vapor characteristic of the polymer pellets 26. In another application, a user may mix the polymer pellets 26 with ice pellets that are sealed in a bag, for example, as would ordinarily be bought at the gas station or convenience store.

In the event that warm water is added to polymer pellets 26 contained in the bag 20, the article effectively becomes a therapeutic device that can help ease muscle pains, swelling, etc.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An thermo-insulating article for absorbing melted ice and the like, said article comprising:
    a flexible bag having a cavity;
    a predetermined quantity of ice pellets deposited within a cavity of said bag; and
    a predetermined quantity of polymer pellets deposited within the cavity of said bag and mixed with said ice pellets such that a homogenous mixture of said ice pellets and said polymer pellets are formed within the cavity;
    wherein said polymer pellets have liquid-absorbing characteristics such that melted ice is absorbed and retained by said polymer pellets during extended periods of time and thereby eliminating the need to drain said bag;
    wherein said polymer pellets have vapor-releasing characteristics such that thermo-energy is released from the melted ice as a vapor rather than as a liquid to thereby prevent a surrounding area from becoming water damaged.

2. The article of claim 1, wherein said bag comprises: a water-impermeable outer surface for maintaining said ice pellets and said polymer pellets confined within the cavity.

3. The article of claim 1, wherein said bag comprises: a water-permeable outer surface for allowing surrounding fluids to penetrate said bag and become absorbed by said polymer pellets.

4. The article of claim 1, wherein said bag comprises: a plurality of monolithically formed walls, one said walls defining a substantially planar bottom surface, other said walls extending upwardly therefrom and engaging a cooler's sidewalls so that said bag becomes nested within a cavity of the cooler and confronts an entire interior surface thereof.

5. An thermo-insulating article for absorbing melted ice and the like, said article comprising:
    a flexible bag having a cavity;
    a predetermined quantity of ice pellets deposited within a cavity of said bag; and
    a predetermined quantity of polymer pellets deposited within the cavity of said bag and mixed with said ice pellets such that a homogenous mixture of said ice pellets and said polymer pellets are formed within the cavity, said polymer pellets and said ice pellets having coextensive shapes;
    wherein said polymer pellets have liquid-absorbing characteristics such that melted ice is absorbed and retained by said polymer pellets during extended periods of time and thereby eliminating the need to drain said bag;
    wherein said polymer pellets have vapor-releasing characteristics such that thermo-energy is released from the melted ice as a vapor rather than as a liquid to thereby prevent a surrounding area from becoming water damaged.

6. The article of claim 5, wherein said bag comprises: a water-impermeable outer surface for maintaining said ice pellets and said polymer pellets confined within the cavity.

7. The article of claim 5, wherein said bag comprises: a water-permeable outer surface for allowing surrounding fluids to penetrate said bag and become absorbed by said polymer pellets.

8. The article of claim 5, wherein said bag comprises: a plurality of monolithically formed walls, one said walls defining a substantially planar bottom surface, other said walls extending upwardly therefrom and engaging a cooler's sidewalls so that said bag becomes nested within a cavity of the cooler and confronts an entire interior surface thereof.

9. A method for absorbing and containing melted ice within a confined area, said method comprising the steps of:
    providing a flexible bag having a cavity;
    depositing a predetermined quantity of ice pellets within a cavity of said bag; and
    depositing a predetermined quantity of polymer pellets within the cavity of said bag and mixed with said ice pellets such that a homogenous mixture of said ice pellets and said polymer pellets are formed within the cavity;
    wherein said polymer pellets have liquid-absorbing characteristics such that melted ice is absorbed and retained by said polymer pellets during extended periods of time and thereby eliminating the need to drain said bag;
    wherein said polymer pellets have vapor-releasing characteristics such that thermo-energy is released from the melted ice as a vapor rather than a liquid to thereby prevent a surrounding area from becoming water damaged.

10. The method of claim 9, further comprising the step of: attaching a pair of elongated and rectilinear support beams to a ground surface wherein said support beams vertically extend upwardly therefrom, said bag being medially intercalated between said support beams and maintained at a static position adjacent an exterior body of water.

11. The method of claim 9, wherein said bag comprises: a water-impermeable outer surface for maintaining said ice pellets and said polymer pellets confined within the cavity.

12. The method of claim 9, wherein said bag comprises: a water-permeable outer surface for allowing surrounding fluids to penetrate said bag and become absorbed by said polymer pellets.

13. The method of claim 9, wherein said bag comprises: a plurality of monolithically formed walls, one said walls defining a substantially planar bottom surface, other said walls extending upwardly therefrom and engaging a cooler's sidewalls so that said bag becomes nested within a cavity of the cooler and confronts an entire interior surface thereof.

* * * * *